United States Patent
Grigoryan et al.

(10) Patent No.: US 8,977,125 B2
(45) Date of Patent: Mar. 10, 2015

(54) LOW POWER OPTICAL TRANSCEIVER USING ORTHOGONAL POLARIZATION DETECTION TECHNIQUE

(75) Inventors: Vladimir S. Grigoryan, Elkridge, MD (US); Vladimir Pelekhaty, Baltimore, MD (US); Michael Y. Frankel, Baltimore, MD (US)

(73) Assignee: Ciena Corporation, Hanover, MD (US)

( * ) Notice: Subject to any disclaimer, the term of this patent is extended or adjusted under 35 U.S.C. 154(b) by 695 days.

(21) Appl. No.: 12/854,668

(22) Filed: Aug. 11, 2010

(65) Prior Publication Data

US 2012/0039606 A1  Feb. 16, 2012

(51) Int. Cl.
*H04J 14/06* (2006.01)
*H04B 10/50* (2013.01)
*H04B 10/61* (2013.01)
*H04B 10/548* (2013.01)

(52) U.S. Cl.
CPC ............ *H04J 14/06* (2013.01); *H04B 10/5053* (2013.01); *H04B 10/611* (2013.01); *H04B 10/613* (2013.01); *H04B 10/614* (2013.01); *H04B 10/6166* (2013.01); *H04B 10/548* (2013.01)
USPC .............................................. 398/65; 398/152

(58) Field of Classification Search
USPC .................................... 398/65, 152
See application file for complete search history.

(56) References Cited

U.S. PATENT DOCUMENTS

| | | | |
|---|---|---|---|
| 6,351,582 B1 | 2/2002 | Dyke et al. | |
| 6,473,223 B1 | 10/2002 | Masum-Thomas | |
| 6,658,013 B1 | 12/2003 | de Boer et al. | |
| 6,795,594 B2 | 9/2004 | Betty | |
| 6,816,680 B2 | 11/2004 | Purse et al. | |
| 6,826,200 B1 | 11/2004 | Pick et al. | |
| 6,829,247 B1 | 12/2004 | Corkum et al. | |
| 6,917,031 B1 | 7/2005 | Sun et al. | |
| 7,037,143 B2 | 5/2006 | Aziz et al. | |
| 7,061,910 B2 | 6/2006 | Beshai | |
| 7,085,501 B1 | 8/2006 | Rickard et al. | |
| 7,315,584 B1 | 1/2008 | Epworth et al. | |
| 7,469,106 B2 | 12/2008 | Feced et al. | |
| 7,555,227 B2 | 6/2009 | Bontu et al. | |
| 7,684,712 B1 | 3/2010 | Roberts et al. | |
| 8,090,270 B2 * | 1/2012 | Zhang et al. | 398/188 |
| 2002/0021218 A1 | 2/2002 | Qiu et al. | |
| 2005/0265727 A1 * | 12/2005 | Glingener | 398/152 |
| 2006/0049947 A1 | 3/2006 | Forster | |
| 2006/0176229 A1 | 8/2006 | Copeland et al. | |
| 2006/0273901 A1 | 12/2006 | Hall et al. | |

(Continued)

*Primary Examiner* — Shi K Li

(74) *Attorney, Agent, or Firm* — Muncy, Geissler, Olds & Lowe, P.C.

(57) ABSTRACT

A method and apparatus for simultaneous processing of signals impressed on a horizontal polarization of a light wave and on a vertical polarization of the light wave is provided. In one embodiment, a horizontal polarization pilot tone is impressed on a data signal carried by the horizontal polarization and a vertical polarization pilot tone is impressed on a data signal carried by the vertical polarization. A receiver processes the dual-polarized light wave and converts it to an X channel signal and a Y channel signal. The X and Y channel signals are processed in separate channels to recover a phase and frequency offset between them and a local oscillator. The phase and frequency recovered and frequency de-multiplexed signals are further processed to polarization de-multiplex the data signal carried by the horizontal polarization and the data signal carried by the vertical polarization.

18 Claims, 11 Drawing Sheets

(56) References Cited

U.S. PATENT DOCUMENTS

| | | |
|---|---|---|
| 2006/0273902 A1 | 12/2006 | Shafer et al. |
| 2007/0205902 A1 | 9/2007 | Cote et al. |
| 2010/0209102 A1* | 8/2010 | Loprieno et al. ............... 398/43 |
| 2010/0329683 A1* | 12/2010 | Liu ............................... 398/81 |
| 2012/0033965 A1* | 2/2012 | Zhang et al. .................... 398/38 |

* cited by examiner

LOW POWER OPTICAL TRANSCEIVER USING ORTHOGONAL POLARIZATION DETECTION TECHNIQUE

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to optical networking and in particular to a method and system for Orthogonal Polarization Detection.

BACKGROUND OF THE INVENTION

The capacity of fiber optic communications channels is rapidly increasing, for example, to 1000 Giga-bits per second (Gbps) per channel, and the channel count is also increasing. This growth is expected to require increased optical amplifier bandwidth, increased levels of modulation format to transmit multiple bits per symbol and decreasing frequency spacing between channels. Increasing modulation format levels increases information capacity for a constant bandwidth but suffers a penalty of decreased signal to noise ratio, resulting in a shorter optical fiber length between regenerators. For example, a loss of about 50% in reach occurs for each additional bit of capacity obtained by increasing the number of bits per symbol. As another example, a change from Quadrature Phase Shift Keying (QPSK) to 16 level Quadrature Amplitude Modulation (QAM) results in approximately a 7 decibel (dB) penalty for a fixed symbol rate. Therefore, if a 100 Gbps QPSK signal propagates 1500 kilometers (km), then a 200 Gbps 16 level QAM signal will propagate only about 300 km. Decreasing frequency spacing between channels also results in a reach penalty due to increased non-linear cross-talk in a fiber.

Several methods for increasing capacity have been considered. Wavelength Division Multiplexing (WDM) using on-off keying with sub-carriers precisely locked to a data rate uses a receiver with optical filtering to select individual sub-carriers and uses direct detection for conversion to the electrical domain. Such a system has low tolerance for chromatic dispersion (CD) and polarization mode dispersion (PMD), and is unable to scale to phase-based or multi-symbol modulation formats.

Coherent Optical Orthogonal Frequency Division Multiplexing (OFDM) is essentially a direct application of wireless OFDM principles to the optical domain. "Virtual" sub-carriers with superimposed data modulation are generated in digital electronics by way of an inverse Fast Fourier Transform (FFT) in a transmitter. The data is recovered at a receiver by applying an FFT. This requires sophisticated digital signal processing and further requires adding redundant data to recover from channel distortion. Also, required bandwidth of opto-electronic components is high, and sub-carriers are of sufficiently low frequency to require complex phase recovery techniques due to their relative sensitivity to optical phase noise.

Sub-band multiplexed OFDM is an extension of OFDM concepts where several closely spaced OFDM channels form a quasi-continuous spectrum. This method requires complex digital signal processing, and power consumption of opto-electronic components is high. Further, sharp roll-off optical filters may be required in some implementations for sub-band separation.

Optically combined Binary Phase Shift Keyed (BPSK) signaling has been shown to be possible in conjunction with direct detection at a receiver. However, proper operation requires high opto-electronic device bandwidth encompassing a complete channel, which is impractical at speeds such as 1000 Gbps.

Single carrier modulated channels can be grouped close together or orthogonalized, in conjunction with a coherent receiver with Digital Signal Processing (DSP) for channel filtering, channel distortion compensation, and data decisions. However, the large amount of DSP required results in large chip sizes and high power consumption.

Another method for increasing capacity is optical Polarization Multiplexing (PM). By placing signals on each of two orthogonal polarizations of a light wave carrier the capacity can be doubled per wavelength. However, de-multiplexing the polarization-dependent signals at a receiver is a challenging task because the state of the polarization varies randomly along the length of the optical fiber that carries the light waves. Thus, conventional coherent detection results in an output that is a mixture of both polarization channels. Although real time optical polarization tracking can be achieved digitally in coherent receivers with high speed digital signal processing (DSP), DSP chips can consume significant power and pose design challenges when scaling to a channel capacities in the Terra-bits per second range. Real time optical polarization tracking at low cost, low complexity with low power consumption is desirable but has been unattainable thus far.

SUMMARY OF THE INVENTION

The present invention advantageously provides a method and system for Orthogonal Polarization Detection (OPD). In accordance with one aspect, the invention provides a method that includes receiving on optical transmission signal having a first signal associated with a horizontal light wave polarization and a second signal associated with a vertical light wave polarization. The first signal has a horizontal polarization pilot tone, and the second signal has a vertical polarization pilot tone. The vertical light wave polarization spectrum is offset in frequency from the horizontal light wave polarization spectrum. The method includes processing the received optical transmission signal by selecting the horizontal polarization pilot tone and selecting the vertical polarization pilot tone and using them to perform recovery of phase and frequency offsets between the transmitted and received signals.

In accordance with another aspect, the present invention provides a method of Orthogonal Polarization Multiplexing. The method includes forming an optical transmission signal having a first signal associated with a horizontal light wave polarization and a second signal associated with a vertical light wave polarization. The first signal has a horizontal polarization pilot tone, and the second signal has a vertical polarization pilot tone. The vertical light wave polarization spectrum is offset in frequency from the horizontal light wave polarization spectrum.

In accordance with yet another aspect, the invention provides an Orthogonal Frequency Division Multiplex receiver that implements Orthogonal Polarization Detection on a received optical transmission signal. The received optical transmission signal has a first set of orthogonal sub-carriers carried by a horizontal polarization of a light wave and a second set of orthogonal sub-carriers carried by a vertical polarization of the light wave. Each of the first set of orthogonal sub-carriers carries a horizontal polarization pilot tone, and each of the second set of orthogonal sub-carriers carries a vertical polarization pilot tone. The second set is offset in frequency from the first set. The receiver has a first processing section to derive an electrical X channel signal and an electrical Y channel signal from the received optical transmission signal. The receiver has a second processing section to further process the electrical X channel signal and the electrical Y channel signal. The second processing section selects the horizontal polarization pilot tones at each of the first set of sub-carriers to recover a first signal for each of the first set of sub-carriers. The second processing section also selects the vertical polarization pilot tones at each of the second set of sub-carriers to recover a second signal for each of the second set of sub-carriers. The recovered first signal for each sub-carrier has data carried on the sub-carrier on the horizontal polarization of the light wave. The recovered second signal for each sub-carrier has data carried on the sub-carrier on the vertical polarization of the light wave.

In accordance with still another aspect, the invention provides an Orthogonal Frequency Division Multiplex transmitter. The transmitter includes an RF sub-carrier generator to generate a first set of orthogonal sub-carriers and a second set of orthogonal sub-carriers. The transmitter also includes a vertical pilot tone generator to provide a vertical polarization pilot tone for each sub-carrier of the first set of orthogonal sub-carriers to produce a vertical polarization signal. A horizontal pilot tone generator provides a horizontal polarization pilot tone for each sub-carrier of the second set of orthogonal sub-carriers to produce a horizontal polarization signal. An offset mixer mixes an offset frequency with the horizontal polarization signal to produce an offset horizontal polarization signal. The transmitter includes a first mixer to impress each one of a first set of data signals on a respective one of the sub-carriers of the vertical polarization signal to produce a first multi-carrier data signal. The transmitter also includes a second mixer to impress each one of a second set of data signals on a respective one of the sub-carriers of the offset horizontal polarization signal to produce a second multi-carrier data signal. A first modulator modulates the first multi-carrier data signal onto a vertical polarization component of a light wave. A second modulator modulates the second multi-carrier data signal onto a horizontal polarization of the light wave.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

A method and apparatus for simultaneous processing of signals impressed on a horizontal polarization of a light wave and on a vertical polarization of the light wave is provided. In one embodiment, a horizontal polarization pilot tone is impressed on a data signal carried by the horizontal polarization and a vertical polarization pilot tone is impressed on a data signal carried by the vertical polarization. A receiver processes the dual-polarized light wave and converts it to an X channel signal and a Y channel signal. The pilot tones are selected from the X and Y channel signals. The X and Y signals are further processed to recover the data signal carried by the horizontal polarization and the data signal carried by the vertical polarization.

Figure 1:
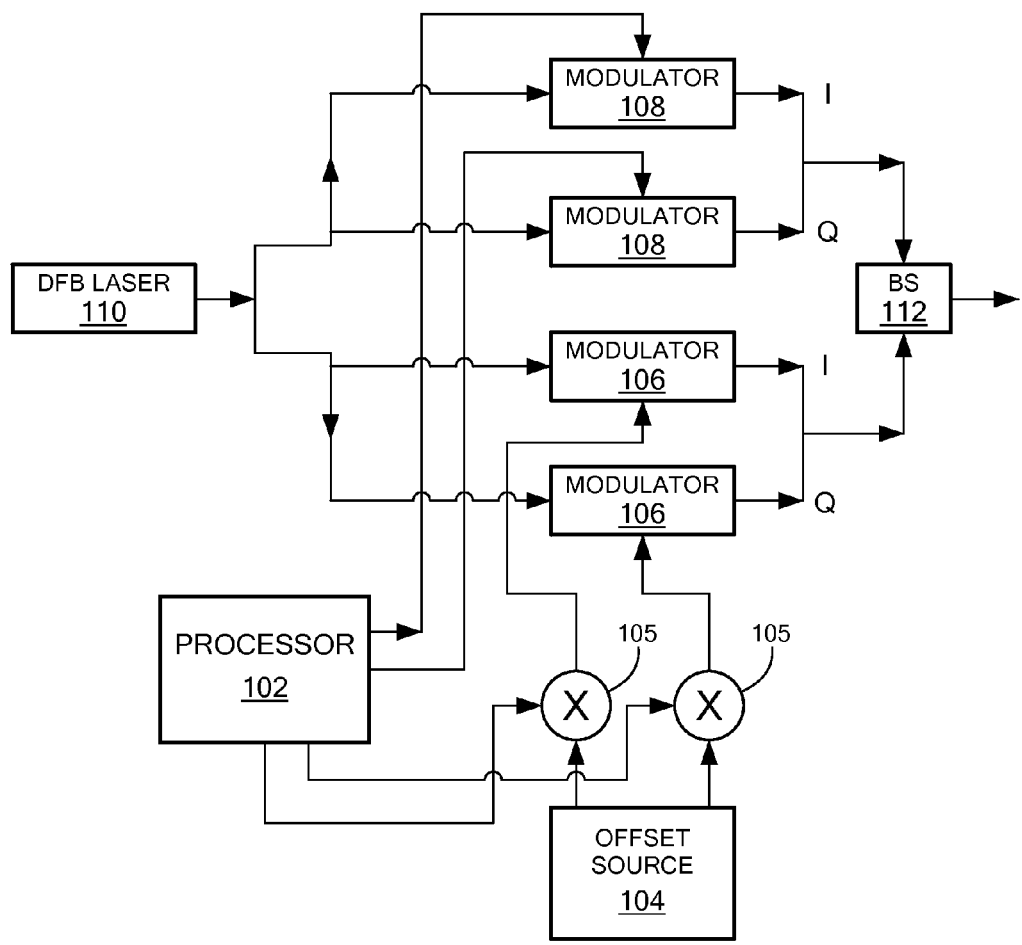
FIG. 1 is a block diagram of an exemplary Orthogonal Polarization Multiplex (OPM) transmitter for a single carrier constructed in accordance with the principles of the present invention.

Referring now to the drawing figures in which like referenced designators refer to like elements, there is shown in FIG. 1 a block diagram of an Orthogonal Polarization Multiplex (OPM) transmitter for a single carrier, constructed in accordance with the principles of the present invention. Data for transmission is received by a processor 102. The processor 102 de-multiplexes the data and modulates the data onto an I channel and a Q channel for each orthogonal polarization, horizontal (H-pol) and vertical (V-pol), according to known techniques.

In one embodiment, the modulation employed is Quadrature Phase Shift Keying (QPSK). In another embodiment, the modulation may be Quadrature Amplitude Modulation (QAM). The processor 102 also employs balanced coding, according to known techniques, to balance ones and zeros in the data streams to be modulated onto the horizontal and vertical polarizations of an optical carrier to produce substantially a central notch in the frequency spectrum of the horizontal polarization signal and the vertical polarization signal. Consequently, after detection and processing of the signals at the receiver, the corresponding balanced de-coding procedure is performed before additional de-coding and de-multiplexing.

The horizontal channel is offset in frequency from the vertical channel by multiplying at multipliers 105 an offset source 104 times the I and Q channels destined for the H-pol optical carrier. In another embodiment, the offset source 104 can be applied, instead, to the I and Q channels destined for the V-pol optical carrier.

The I and Q channel signals for the horizontal polarization are sent to a first set of Mach Zehnder Modulators (MZM) 106 and the I and Q channel signals for the vertical polarization are sent to a second set of MZMs 108. The first set of MZMs 106 modulate a horizontally polarized component of a laser beam from a distributed feedback (DFB) laser 110 and the second set of MZMs 108 modulate a vertically polarized component of the laser beam. The V-pol signal and the H-pol signal are combined by an optical combiner 112 and transmitted on an optical fiber.

Figure 2:
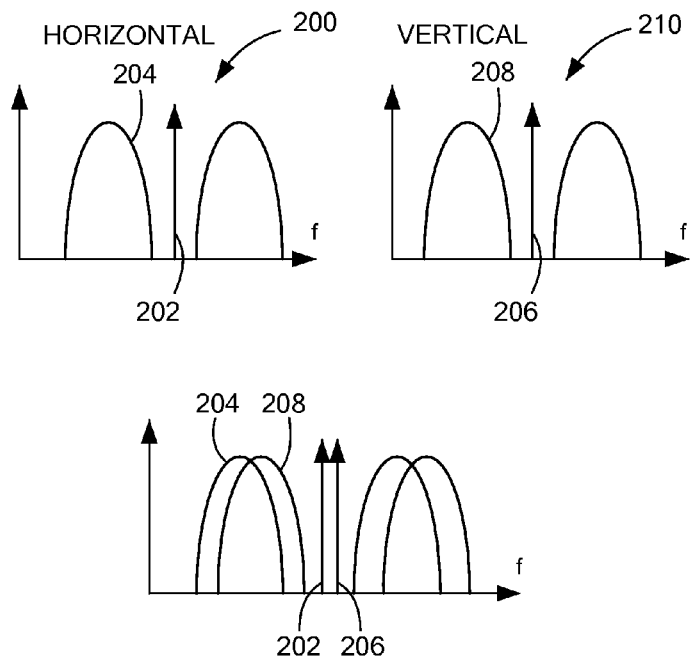
FIG. 2 is a frequency distribution of a horizontally polarized signal and a frequency distribution of a vertically polarized signal.

FIG. 2 is a frequency distribution of a horizontally polarized signal 200 and a frequency distribution of a vertically polarized signal 210. The horizontally polarized signal 200 has a horizontal polarization pilot tone 202 and data carrying distributions 204. The vertically polarized signal 210 has a vertical polarization pilot tone 206 and data carrying distributions 208. The horizontally polarized signal 200 and the vertically polarized signal 210 are offset in frequency a slight amount. In some embodiments, the amount of offset is less than 5% of the bandwidth of the horizontally polarized signal 200 or the vertically polarized signal 210. In other embodiments, the amount of offset is less than 2% of the bandwidth of the vertically or horizontally polarized signal. In another embodiment, the offset is between 10 and 100 Mega-Hertz (MHz).

Figure 3:
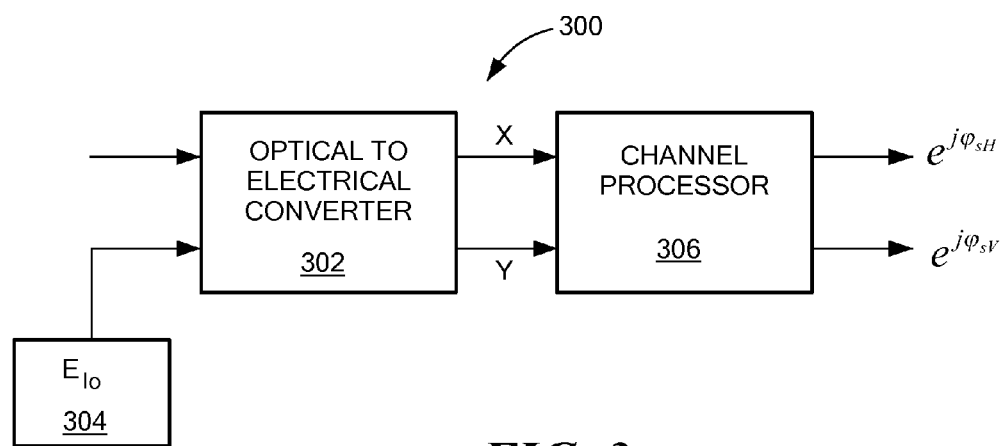
FIG. 3 is a block diagram of a Polarization Multiplexed (PM) Optical Polarization Detection (OPD) Quadrature Phase Shift Keyed (QPSK) receiver for a single carrier constructed in accordance with the principles of the present invention.

FIG. 3 is a block diagram of an exemplary Polarization Multiplexed (PM) Optical Polarization Detection (OPD) Quadrature Phase Shift Keyed (QPSK) receiver 300 for a single carrier, constructed in accordance with the principles of the present invention. The receiver 300 includes a first section 302 and a second 306. The first section 302 is an optical-to-electrical (OEC) converter that receives the vertically and horizontally polarized signals, such as the signals provided by the transmitter 100 of FIG. 1, mixes the signals with an optical signal from a local oscillator 304, and splits the signals to produce an electrical X channel signal and an electrical Y channel signal. The second section 306 processes the X channel signal in a first channel and processes the Y channel signal in a second channel. The second section has two outputs. One output is the down converted modulated signal $e^{i\Phi_{sH}}$ derived from the signal that was impressed on the horizontal polarization of the light wave and the other output is the down converted modulated signal $e^{i\Phi_{sV}}$ derived from the signal that was impressed on the vertical polarization of the light wave.

Figure 4:
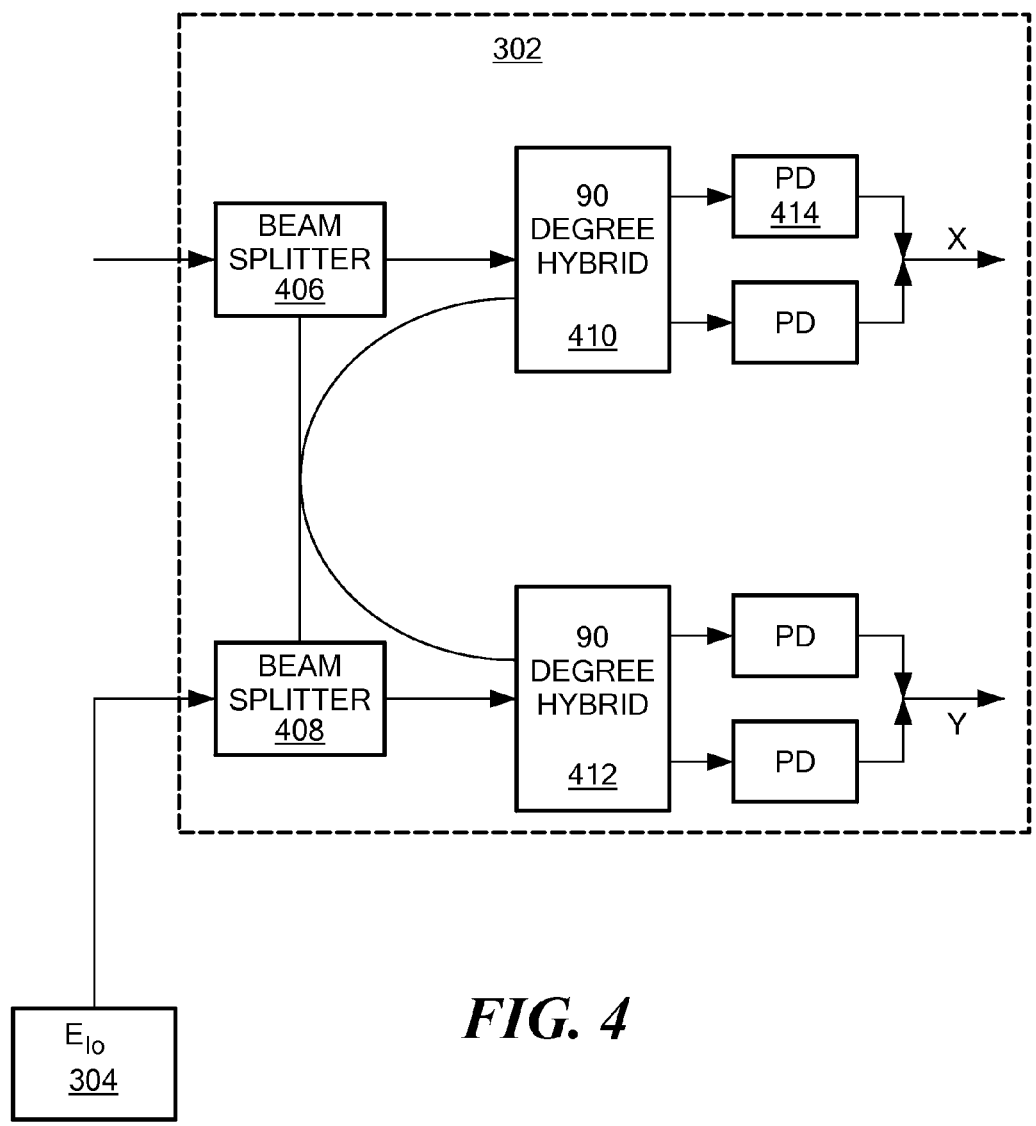
FIG. 4 is a more detailed block diagram of a first section of a PM OPD QPSK receiver.

FIG. 4 is a more detailed block diagram of the first section 302 of FIG. 3. The first section 302 receives an optical transmission signal that has a vertically polarized signal and a horizontally polarized signal from a fiber coupled to a transmitter, such as the transmitter of FIG. 1. The first section 302 also receives an optical local oscillator signal from the optical local oscillator 304. The optical transmission signal and the optical local oscillator signal are split into two signals each in beam splitters 406 and 408. Beam splitters 406 and 408 are oriented orthogonally to extract orthogonally polarized signals at their outputs. Because the polarization of the optical light wave carried by the fiber rotates along the length of the fiber, the extracted orthogonally polarized signals from the beam splitter 406 each have components of the transmitted horizontal and vertical polarizations.

The extracted X-polarized signals are coupled to a 90 degree hybrid device 410, which mixes the X-polarized local oscillator signal from the beam splitter 408 and the X-polarized optical transmission signal from the beam splitter 406 to produce real and imaginary parts of an X channel signal, $X=E_{LOx}*E_{sx}$. The extracted Y-polarized signals are coupled to a 90 degree hybrid device 412, which mixes the Y-polarized local oscillator signal from the beam splitter 408 and the Y-polarized optical transmission signal from the beam splitter 406 to produce real and imaginary parts of a Y channel signal, $Y=E_{LOy}*E_{sy}$. The real and imaginary parts of the X channel signal and the Y channel signal are converted to electrical signals by photo-detectors 414. Note that while X and Y outputs are shown as single variables for convenience, in fact these signals contain both real and imaginary components that may be operated upon separately, in accordance with the principles described herein.

Figure 5:
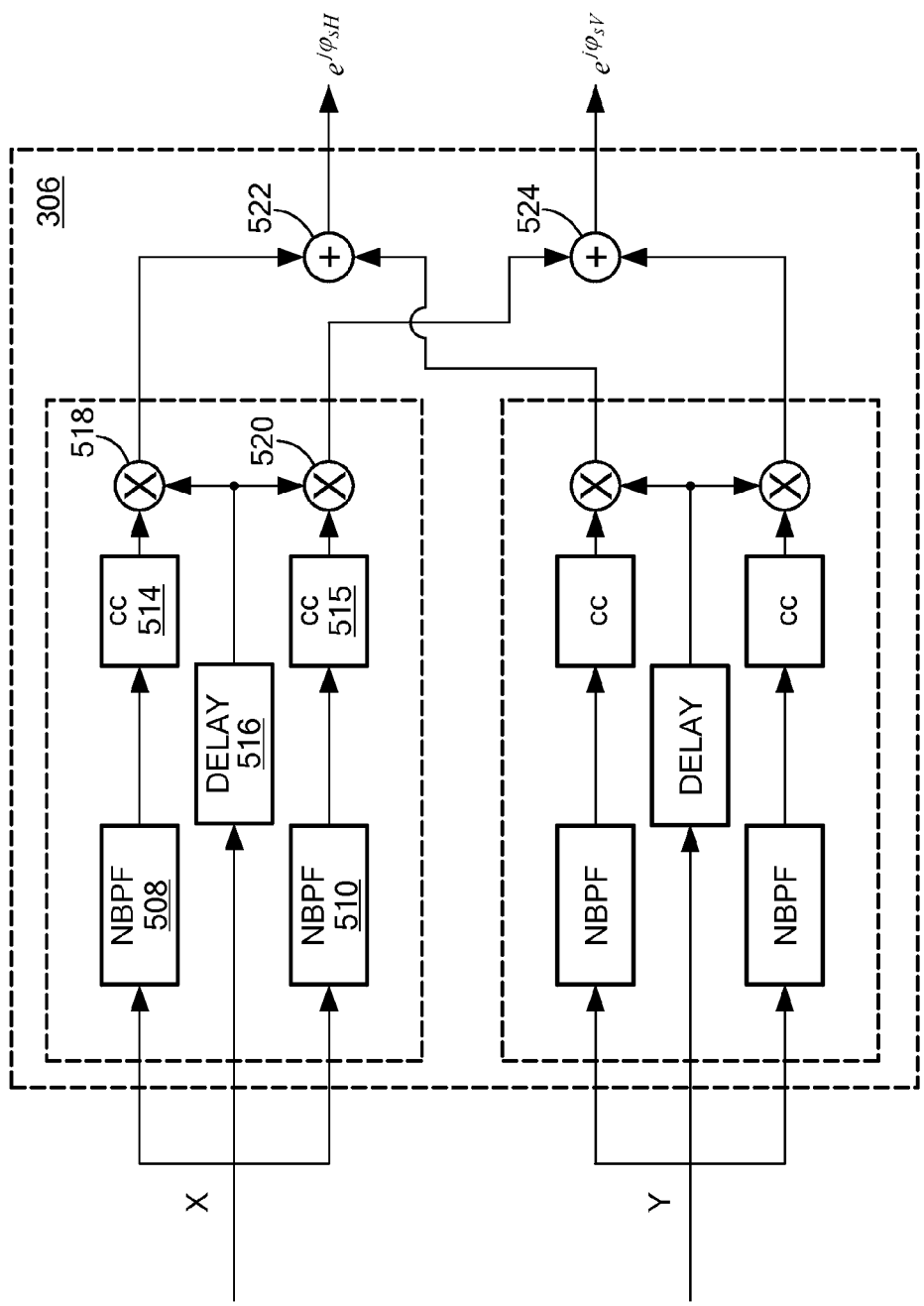
FIG. 5 is a more detailed block diagram of a second section of a PM OPD QPSK receiver.

FIG. 5 is a more detailed block diagram of the second section 306 of the receiver 300 shown in FIG. 3. The second section 306 includes an X channel processor 502 and a Y channel processor 504. The X channel processor 502 includes three branches. A first branch includes a first narrow band pass filter (NBPF) 508 to selectively filter the horizontal polarization pilot tone of the X channel signal. The selected horizontal pilot is complex-conjugated by a complex-conjugator 514 to produce a conjugated horizontal X-channel pilot tone $X_{cH}$ that is fed to a mixer 518. A second branch includes a delay 516 to match the delay introduced by the first branch. The delayed X channel signal from the delay 516 is coupled to the mixer 518 and multiplied by the conjugated pilot tone $X_{cH}$ to produce $X_{cH}X$. In some embodiments, the mixers 518 and 520 may be Gilbert multipliers, but the invention is not limited to such.

A third branch includes a narrow band pass filter (NBPF) 510 to selectively filter the vertical polarization pilot tone of the X channel signal. The selected vertical pilot is complex-conjugated by a complex-conjugator 515 to produce a conjugated vertical X-channel pilot tone $X_{cV}$. The delayed X channel signal from the delay 516 is coupled to a mixer 520 and multiplied by the conjugated pilot tone $X_{cV}$ to produce $X_{cV}X$.

The Y channel processor 504 processes the Y channel signal in a manner that is similar to the processing of the X channel signal by the X channel processor 502 to produce $Y_{cH}Y$ and $Y_{cV}Y$. An adder 522 adds the signals $X_{cH}X$ and $Y_{cH}Y$ to produce $e^{i\Phi_{sH}}$. Similarly, an adder 524 adds the signals $X_{cV}X$ and $Y_{cV}Y$ to produce $e^{i\Phi_{sV}}$. The signals $e^{i\Phi_{sH}}$ and $e^{i\Phi_{sV}}$ may then be decoded and de-multipexed to recover the data signals carried by the horizontal and vertical polarizations of the light wave, respectively.

Figure 6:
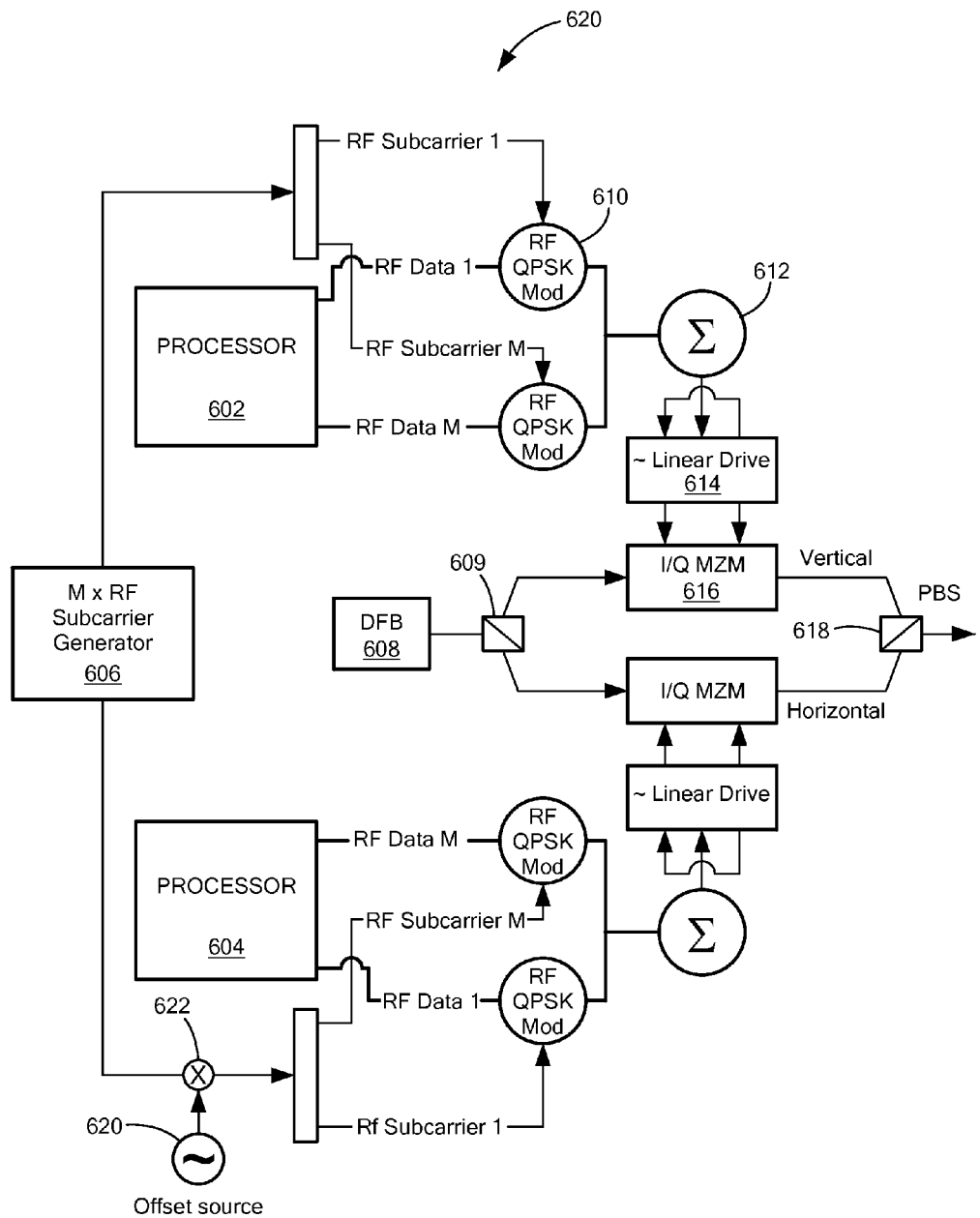
FIG. 6 is a block diagram of an OPM OFDM transmitter having M sub-carriers, constructed in accordance with the principles of the present invention.

FIG. 6 is a block diagram of an exemplary Orthogonal Polarization OFDM transmitter 600 for transmitting orthogonally polarized signals on M sub-carriers, constructed in accordance with the principles of the present invention. A first processor 602 processes data to be transmitted on a vertically polarized component of a light wave. A second processor 604 processes data to be transmitted on a horizontally polarized component of the light wave. The processing may include de-multiplexing data into M×(I+Q) channels, line coding the data to produce a null at a center of a frequency distribution at each sub-carrier, and adding a pilot tone at the center of the frequency distribution at each sub-carrier. An M sub-carrier generator 606 generates M sub-carriers to be mixed by mixers 610 and 611 with the channels produced by the first and second processors 602 and 604, respectively. M sub-carriers to be mixed in the mixer 610 are offset by a small frequency by mixing the sub-carriers at the mixer 622 with an output of an offset source 620. The M data/sub-carrier signals from the mixers 612 are summed in a summer 612 and coupled to a linear drive circuit 614 that drives I and Q MZMs 616. The MZMs 616 impress the M data/sub-carrier signals onto a vertically polarized component of a light wave from a distributed feedback (DFB) laser 608. The light wave from the DFB laser 608 is split by a beam splitter 609 and each beam is coupled to a respective one of the MZMs 616. Similarly, M data/sub-carrier signals are impressed onto a horizontally polarized component of the light wave. The horizontal and vertical components are combined into a single light wave signal by a Polarization Beam Splitter (PBS) 618 and coupled to an optical fiber.

Figure 7:
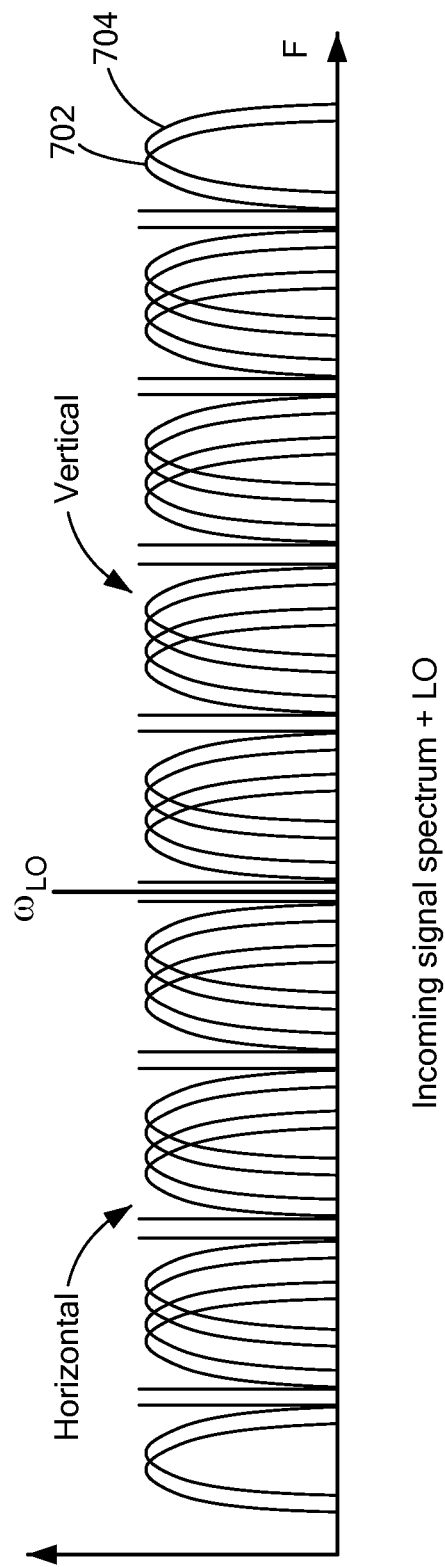
FIG. 7 is a diagram of an exemplary spectrum of a horizontal polarization signal and a vertical polarization signal, each having 8 sub-carriers.

FIG. 7 is a spectrum of a horizontal polarization signal and vertical polarization signal, each having 8 sub-carriers. A signal 702 is impressed on the horizontally polarized component of the light wave and a signal 704 is impressed on the vertically polarized component of the light wave, for 8 sub-carriers. Thus, the transmitter of FIG. 6 produces an optical transmission signal having a first set of orthogonal sub-carriers carried by a horizontal polarization of a light wave, and having a second set of orthogonal sub-carriers carried by a vertical polarization of the light wave. Each of the first set of orthogonal sub-carriers carries a horizontal polarization pilot tone and each of the second set of orthogonal sub-carriers carries a vertical polarization pilot tone that is offset in frequency from a corresponding horizontal polarization pilot tone of a corresponding one of the first set of orthogonal sub-carriers.

Figure 8:
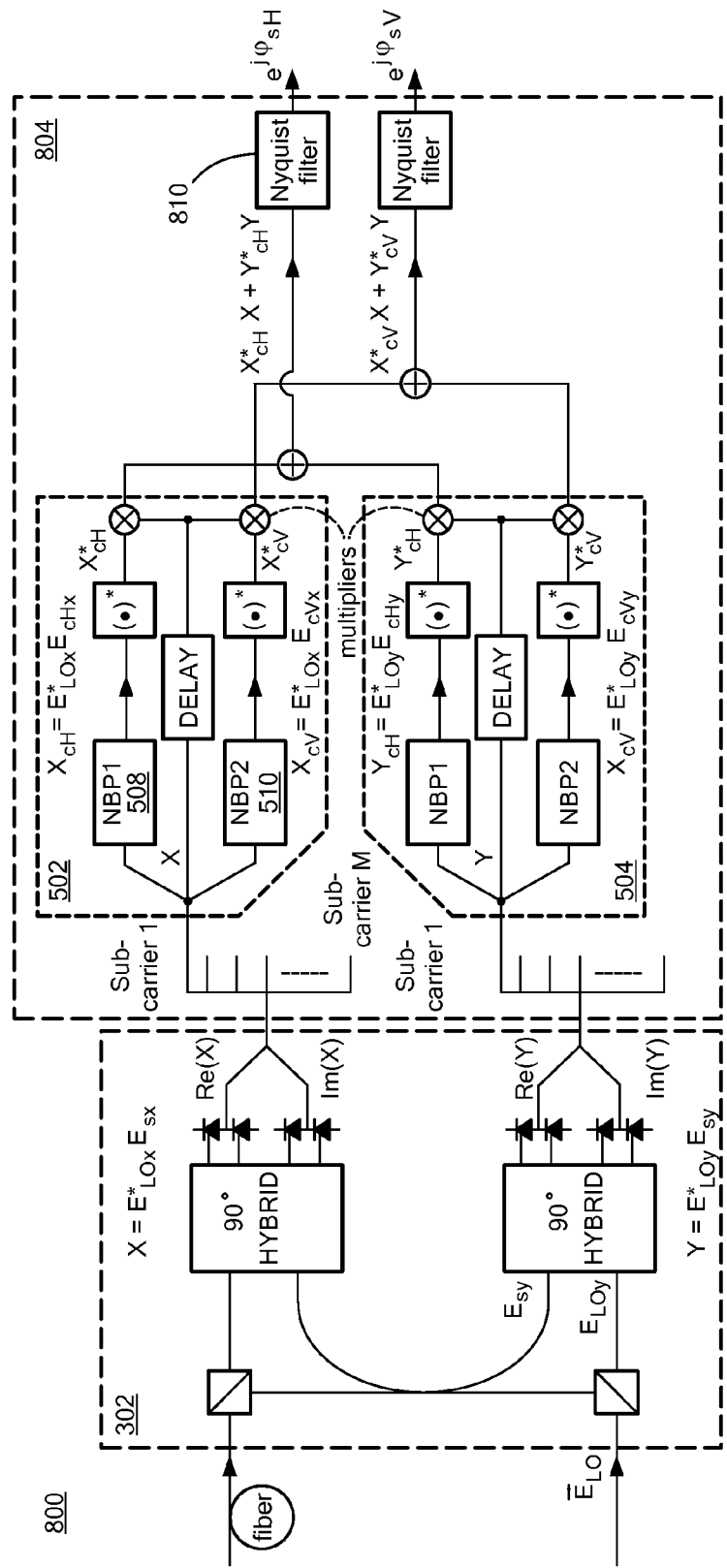
FIG. 8 is a block diagram of an M sub-carrier Polarization Multiplexed (PM) Orthogonal Polarization Detection (OPD) Orthogonal Frequency Division Multiplexed (OFDM) Quadrature Phase Shift Keyed (QPSK) receiver, constructed in accordance with the principles of the present invention.

FIG. 8 is a block diagram of an exemplary M sub-carrier Polarization Multiplexed (PM) Orthogonal Polarization Detection (OPD) Orthogonal Frequency Division Multiplexed (OFDM) Quadrature Phase Shift Keyed (QPSK) receiver 800, constructed in accordance with the principles of the present invention. The receiver 800 has a first section 302 that mixes the received optical transmission signal, such as an optical transmission signal transmitted by the transmitter of FIG. 6, with an optical local oscillator signal $E_{LO}$, and converts the received optical transmission signal to electrical X and Y channel signals. The operation of the first section 302 is described above with reference to FIG. 4.

The receiver 800 includes a second section 804 that produces 2×M outputs $e^{i\Phi_s V^{(m)}}$ and $e^{i\Phi_s V^{(m)}}$ The second section 804 has an X channel processor 502 and a Y channel processor 504 for each of the M sub-carriers. The operation of the X channel processor 502 is described above with reference to FIG. 5. The operation of the Y channel processor 504 is described above with reference to FIG. 5. In FIG. 8, a first narrow band pass filter 508 selectively filters the horizontal polarization pilot tone of the first sub-carrier of the X channel signal received from the first section 302. A second narrow band pass filter 510 selectively filters the vertical polarization pilot tone of the first sub-carrier of the X channel signal received from the first section 302. The second section 804 also has a Nyquist 810 filter for each polarization and each sub-carrier to selectively filter the desired data signal carried by the respective polarization and sub-carrier.

Figure 9:
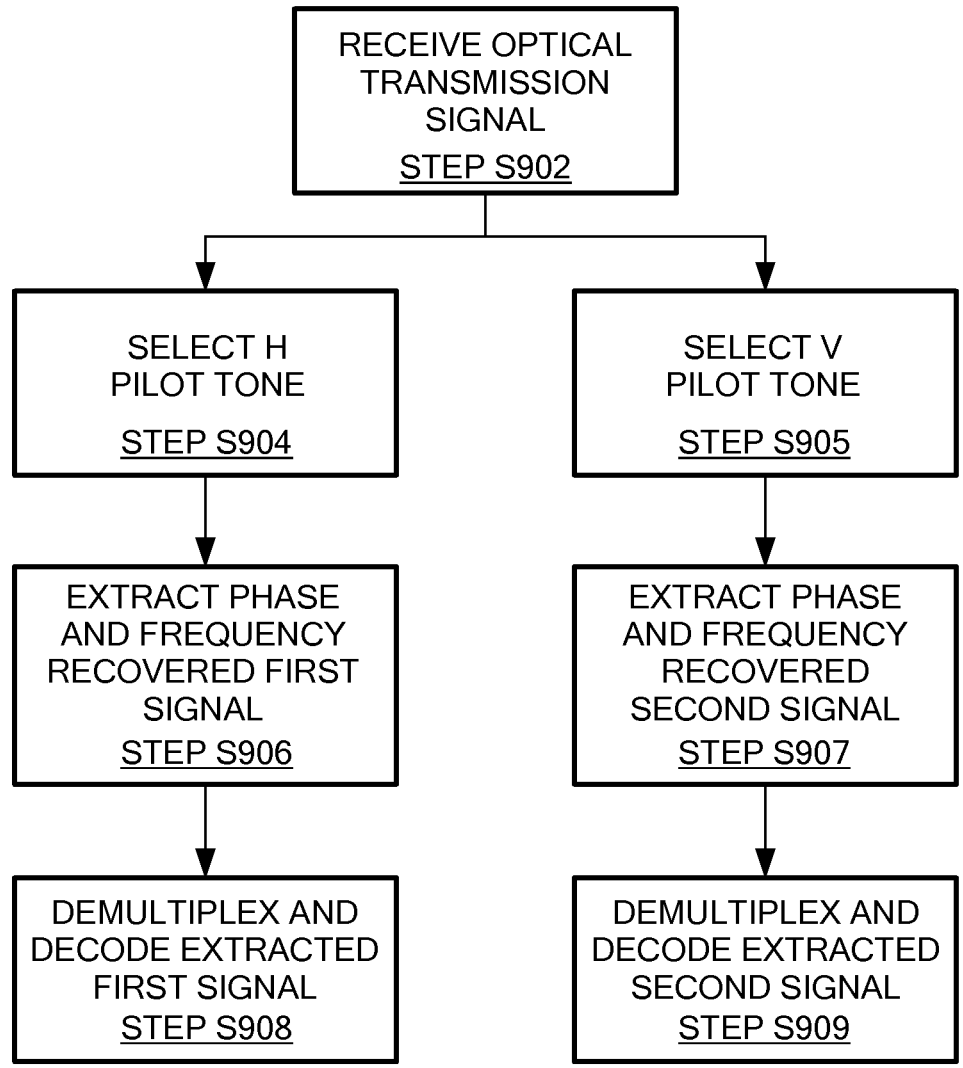
FIG. 9 is a flow chart for processing an Orthogonally Polarized single carrier signal.

FIG. 9 is a flow chart for processing orthogonally polarized optical transmission signals such as the optical transmission signal transmitted by the transmitter of FIG. 1 or FIG. 6. In a first step S902, a receiver receives the optical transmission signal. The received optical transmission signal has, for each sub-carrier, a first signal associated with a horizontal light wave polarization and a second signal associated with a vertical light wave polarization. The first signal has a horizontal polarization pilot tone, and the second signal has a vertical polarization pilot tone. The vertical polarization pilot tone is offset in frequency from the horizontal polarization pilot tone.

The optical transmission signal is processed to select the horizontal pilot tone at step S904, and to select the vertical pilot tone at step S905. Steps S904 and S905 may be performed simultaneously. At steps S906 and S907, a first signal and a second signal are phase and frequency recovered, from the signals obtained from steps S904 and S905, respectively. The first recovered signal is associated with the horizontal light wave polarization and the second recovered signal is associated with the vertical light wave polarization. At steps S908 and S909, the first and second recovered signals are de-multiplexed and decoded to obtain the data that was impressed upon each polarization component, respectively. Steps S904 through S909 may be performed for each sub-carrier of an OFDM signal.

Figure 10:
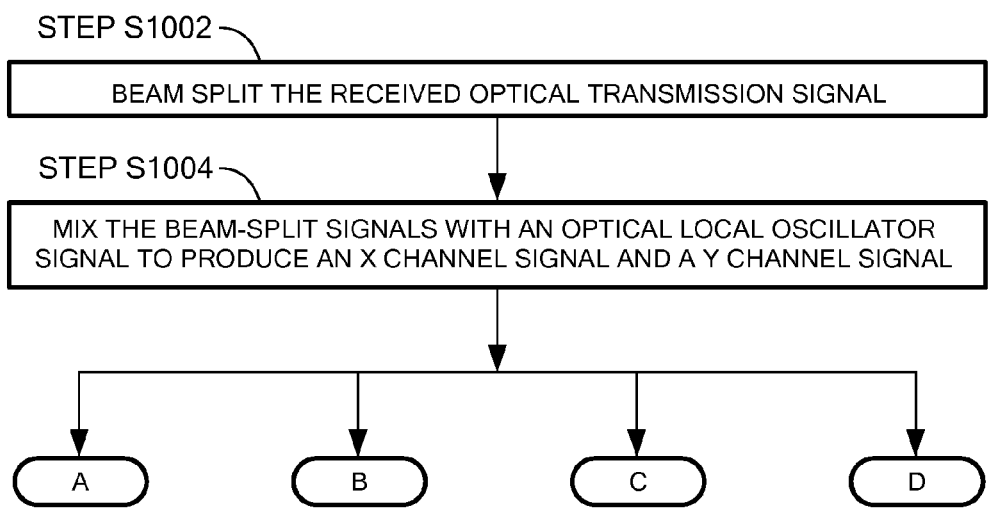
FIG. 10 is a flow chart for processing a multi-carrier Orthogonally Polarized signal to produce X and Y channel signals.
Figure 11:
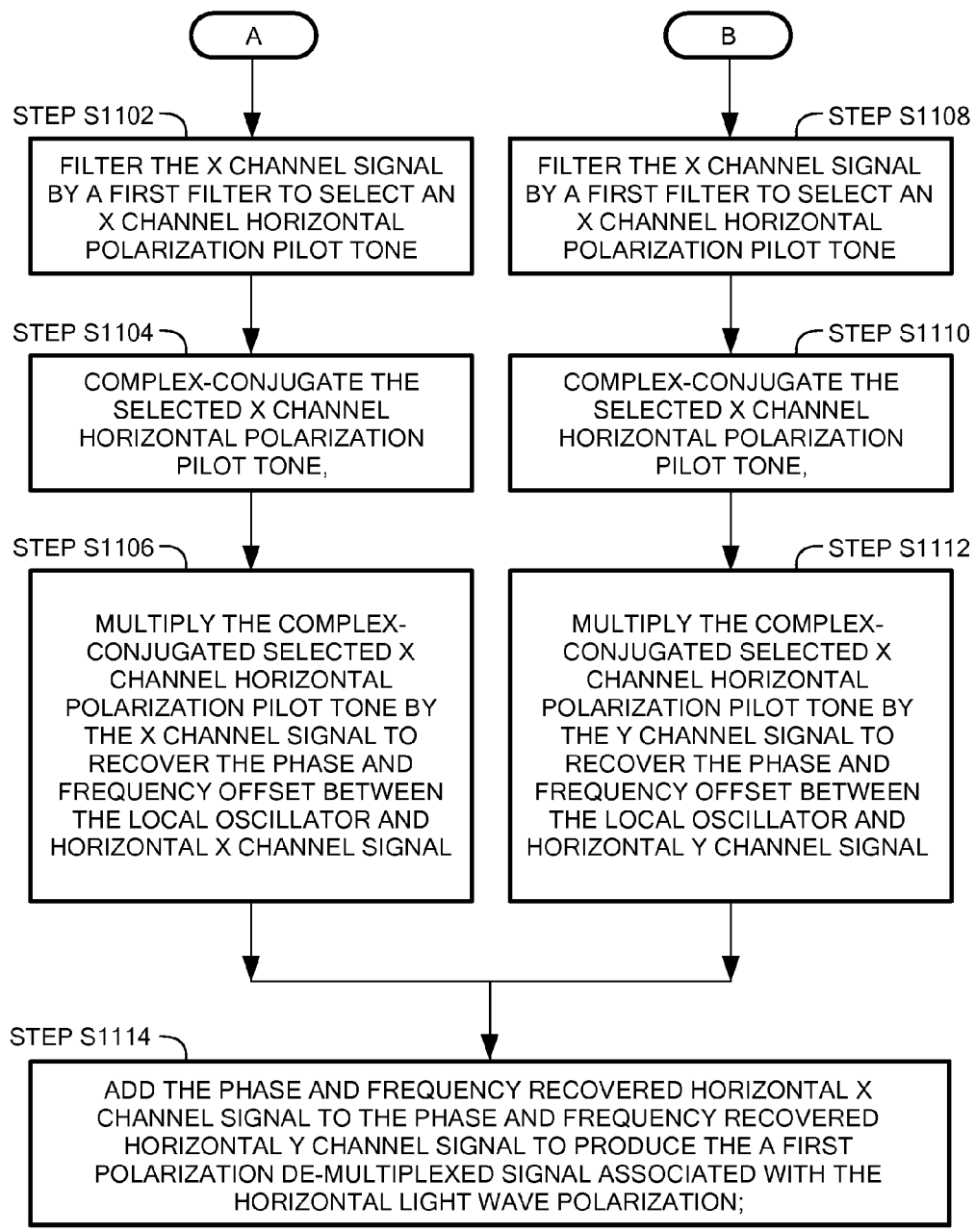
FIG. 11 is a flow chart for processing X and Y channel signals to produce a first recovered signal for a sub-carrier associated with a horizontal polarization of a light wave.
Figure 12:
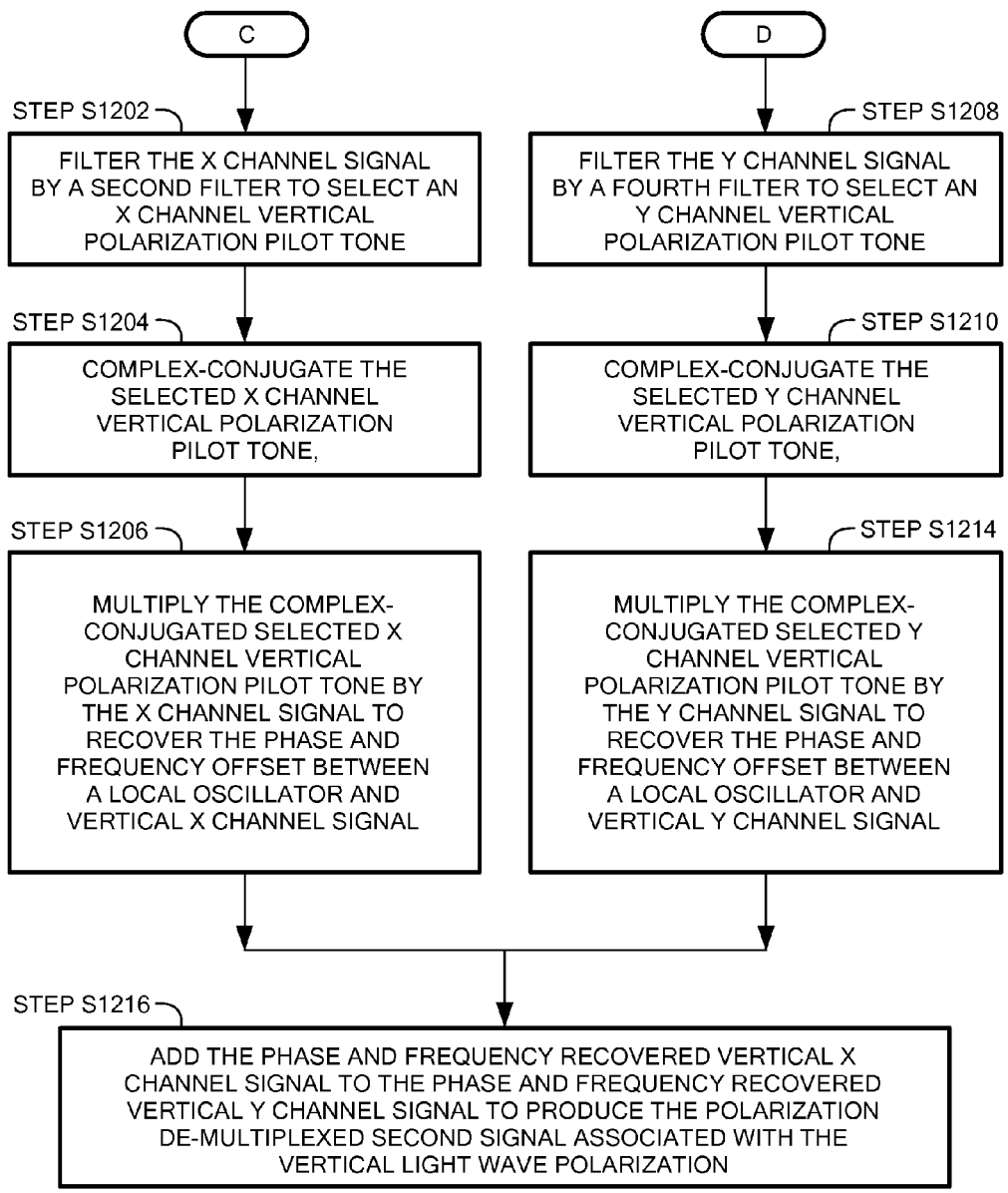
FIG. 12 is a flow chart for processing X and Y channel signals to produce a second recovered signal for a sub-carrier associated with a vertical polarization of a light wave.

FIGS. 10-12 are flow charts of an embodiment for processing orthogonally polarized signals according to the methods described herein. The process begins by beam-splitting a received optical transmission signal, at step S1002. At step S1004, the beam-split signals are mixed with an optical local oscillator signal to produce an X channel signal and a Y channel signal. Processes A, B, C, and D are then performed on the X channel signal and the Y channel signal, simultaneously.

Processes A and B are depicted in FIG. 11. In process A, at step S1102, the X channel signal is filtered to select an X channel horizontal polarization pilot tone. In process B, at step S1108, the Y channel signal is filtered to select a Y channel horizontal polarization pilot tone. In process A, at step S1104, the selected X channel horizontal polarization pilot tone is complex-conjugated. In process B, at step S1110, the selected Y channel horizontal polarization pilot tone is complex-conjugated. In process A, at step S1106, the complex-conjugated selected X channel horizontal polarization pilot tone is multiplied by the X channel signal to produce a phase and frequency recovered horizontal X channel signal. Similarly, in process B, at step S1112, the complex-conjugated selected Y channel horizontal polarization pilot tone is multiplied by the Y channel signal to produce a phase and frequency recovered horizontal Y channel signal. Finally, at step S1116 the phase and frequency recovered horizontal X channel signal and the phase and frequency recovered horizontal Y channel signal are added together to produce a polarization demultiplexed first signal associated with the horizontal light wave polarization.

Processes C and D are depicted in FIG. 12. In process C, at step S1202, the X channel signal is filtered to select an X channel vertical polarization pilot tone. In process D, at step S1208, the Y channel signal is filtered to select a Y channel vertical polarization pilot tone. In process C, at step S1204, the selected X channel vertical polarization pilot tone is complex-conjugated. In process D, at step S1210, the selected Y channel vertical polarization pilot tone is complex-conjugated. In process C, at step S1206, the complex-conjugated selected X channel vertical polarization pilot tone is multiplied by the X channel signal to produce a phase and frequency recovered vertical X channel signal. Similarly, in process D, at step S1212, the complex-conjugated selected Y channel vertical polarization pilot tone is multiplied by the Y channel signal to produce a phase and frequency recovered vertical Y channel signal. Finally, at step S1216, the phase and frequency recovered vertical X channel signal and the phase and frequency recovered vertical Y channel signal are added together to produce a polarization demultiplexed second signal associated with the vertical light wave polarization.

Embodiments described herein may provide an advantage of being scalable for transmitter and receiver designs carrying 1 Tera-bit per second and above within a single circuit package. Embodiments may be implemented in a highly integrated platform that minimizes power consumption and cost.

Methods described herein increase spectral utilization efficiency. The methods also allow the use of optical and electronic components that are bandwidth limited to a fraction of the desired total bandwidth capacity. For example, bandwidth may be limited to 40 GHz, in current state of the art components. The methods described herein may provide acceptable tolerance to chromatic dispersion, polarization mode dispersion, and ASE noise. Also, higher levels of modulation may be employed.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of performing Orthogonal Polarization Detection, the method comprising:
  receiving an optical transmission signal having a first signal associated with a horizontal light wave polarization and a second signal associated with a vertical light wave polarization, the first signal having a horizontal polarization pilot tone, and the second signal having a vertical polarization pilot tone, a spectrum of the first signal and a spectrum of the horizontal polarization pilot tone being offset in frequency from a spectrum of the second signal and a spectrum of the vertical polarization pilot tone;
  processing the received optical transmission signal by selecting the horizontal polarization pilot tone and selecting the vertical polarization pilot tone and recovering a phase and frequency recovered first signal associated with the horizontal light wave polarization and a phase and frequency recovered second signal associated with the vertical light wave polarization, wherein processing the received optical transmission signal comprises splitting the received optical transmission signal into a first channel signal and a second channel signal; and
  using a vertical polarization pilot tone and a horizontal polarization pilot tone from the first channel signal to produce a first horizontal phase and frequency recovered signal and a first vertical phase and frequency recovered signal and using a vertical polarization pilot tone and a horizontal polarization pilot tone from the second channel signal to produce a second horizontal phase and frequency recovered signal and a second vertical phase and frequency recovered signal.

2. The method of claim 1, wherein processing the received optical transmission signal comprises:
  beam splitting the received optical transmission signal and mixing the received optical transmission signal with an optical local oscillator signal to produce an X channel signal and a Y channel signal.

3. The method of claim 2, wherein processing the received optical transmission signal comprises:
  filtering the X channel signal by a first filter to select an X channel horizontal polarization pilot tone, complex-conjugating the selected X channel horizontal polarization pilot tone, and multiplying the complex-conjugated selected X channel horizontal polarization pilot tone by the X channel signal to select the X channel horizontal polarization pilot tone from the X channel signal to produce a phase and frequency recovered horizontal X channel signal; and
  filtering the X channel signal by a second filter to select an X channel vertical polarization pilot tone, complex-conjugating the selected X channel vertical polarization pilot tone, and multiplying the complex-conjugated selected X channel vertical polarization pilot signal by the X channel signal to select the vertical polarization pilot tone from the X channel signal to produce a phase and frequency recovered vertical X channel signal.

4. The method of claim 3, wherein processing the received optical transmission signal further comprises:
  filtering the Y channel signal by a third filter to select a Y channel horizontal polarization pilot tone, complex-conjugating the selected Y channel horizontal polarization pilot tone, and multiplying the complex-conjugated selected Y channel horizontal polarization pilot tone by the Y channel signal to select the Y channel horizontal polarization pilot tone from the Y channel signal to produce a phase and frequency recovered horizontal Y channel signal; and
  filtering the Y channel signal by a fourth filter to select a Y channel vertical polarization pilot tone, complex-conjugating the selected Y channel vertical polarization pilot tone, and multiplying the complex-conjugated selected Y channel vertical polarization pilot signal by the X channel signal to select the vertical polarization pilot tone from the Y channel signal to produce a phase and frequency recovered vertical Y channel signal.

5. The method of claim 4, wherein processing the received optical transmission signal further comprises:
  adding the phase and frequency recovered horizontal X channel signal to the phase and frequency recovered horizontal Y channel signal to produce the first signal associated with the horizontal light wave polarization; and
  adding the phase and frequency recovered vertical X channel signal to the phase and frequency recovered vertical Y channel signal to produce the second signal associated with the vertical light wave polarization.

6. The method of claim 1, further comprising recovering the first signal by adding the first horizontal phase and frequency recovered signal and the second horizontal phase and frequency recovered signal, and recovering the second signal by adding the first vertical phase and frequency recovered signal and the second vertical phase and frequency recovered signal.

7. The method of claim 1, wherein the offset between the spectrum of the horizontal polarization pilot tone and the spectrum of the vertical polarization pilot tone is less than 5% of a bandwidth of the first signal or the second signal.

8. The method of claim 1, wherein the offset between the spectrum of the horizontal polarization pilot tone and the spectrum of the vertical polarization pilot tone is less than 2% of a bandwidth of the first signal or the second signal.

9. A method of Orthogonal Polarization Multiplexing, the method comprising: forming an optical transmission signal having a first signal associated with a horizontal light wave polarization and a second signal associated with a vertical light wave polarization, the first signal having a horizontal polarization pilot tone, and the second signal having a vertical polarization pilot tone, the first signal having a spectrum that is offset in frequency from a spectrum of the second signal, and the horizontal polarization pilot tone having a spectrum that is offset in frequency from a spectrum of the vertical polarization pilot tone;
  processing the optical transmission signal by selecting the horizontal polarization pilot tone and selecting the vertical polarization pilot tone and recovering a phase and frequency recovered first signal associated with the horizontal light wave polarization and a phase and frequency recovered second signal associated with the vertical light wave polarization, wherein processing the optical transmission signal comprises splitting the received optical transmission signal into a first channel signal and a second channel signal;

using a vertical polarization pilot tone and a horizontal polarization pilot tone from the first channel signal to produce a first horizontal phase and frequency recovered signal and a first vertical phase and frequency recovered signal and using a vertical pilot tone and a horizontal pilot tone from the second channel signal to produce a second horizontal phase and frequency recovered signal and a second vertical phase and frequency recovered signal; and wherein processing the optical transmission signal comprises:

beam splitting the optical transmission signal and mixing the optical transmission signal with an optical local oscillator signal to produce an X channel signal and a Y channel signal; and filtering the X channel signal by a first filter to select an X channel horizontal polarization pilot tone, complex-conjugating the selected X channel horizontal polarization pilot tone, and multiplying the complex-conjugated selected X channel horizontal polarization pilot tone by the X channel signal to select the X channel horizontal polarization pilot tone from the X channel signal to produce a phase and frequency recovered horizontal X channel signal; and filtering the X channel signal by a second filter to select an X channel vertical polarization pilot tone, complex-conjugating the selected X channel vertical polarization pilot tone, and multiplying the complex-conjugated selected X channel vertical polarization pilot signal by the X channel signal to select the vertical polarization pilot tone from the X channel signal to produce a phase and frequency recovered vertical X channel signal.

10. The method of claim 9, data is impressed on the optical transmission signal by Quadrature Phase Shift Keying (QPSK).

11. The method of claim 10, wherein data is line encoded and impressed upon the first signal and the second signal to create substantially a notch at or near a center of a frequency distribution of the first signal and to create substantially a notch at or near a center of a frequency distribution of the second signal.

12. The method of claim 9, wherein the offset in frequency is less than 5% of a bandwidth of one of the first signal and the second signal.

13. The method of claim 9, wherein the offset in frequency is less than 2% of a bandwidth of one of the first signal and the second signal.

14. The method of claim 9, wherein a first set of data is impressed upon the horizontal light wave polarization and a second set of data is impressed upon the vertical light wave polarization.

15. An Orthogonal Frequency Division Multiplex receiver for performing Orthogonal Polarization Detection on a received optical transmission signal, the optical transmission signal having a first set of orthogonal sub-carriers carried by a horizontal polarization of a light wave, each of the first set of orthogonal sub-carriers carrying a horizontal polarization pilot tone, and having a second set of orthogonal sub-carriers carried by a vertical polarization of the light wave, each of the second set of orthogonal sub-carriers carrying a vertical polarization pilot tone, the second set offset in frequency from the first set, the horizontal polarization pilot tone offset in frequency from the vertical polarization pilot tone, the receiver comprising:

a first processing section, the first processing section configured to receive the optical transmission signal and derive an electrical X channel signal and an electrical Y channel signal from the received optical transmission signal; and a second processing section, the second processing section configured to process the electrical X channel signal and the electrical Y channel signal by selecting the pilot tones from each sub-carrier, recover a phase and frequency recovered polarization and frequency de-multiplexed first signal for each sub-carrier of the first set of sub-carriers, and recover a phase and frequency recovered polarization and frequency de-multiplexed second signal for each sub-carrier of the second set of sub-carriers, the phase and frequency recovered polarization and frequency de-multiplexed first signal for each sub-carrier having data carried by the horizontal polarization of the light wave, and the phase and frequency recovered polarization and frequency de-multiplexed second signal for each sub-carrier having data carried by the vertical polarization of the light wave;

wherein the second processing section includes a separate processing channel for each sub-carrier; and wherein in each channel for each sub-carrier a first filter to select a horizontal polarization pilot tone and a second filter to select a vertical polarization pilot tone.

16. The receiver of claim 15, further comprising, in each channel for each sub-carrier:

a first phase and frequency recovery circuit in a first branch of the channel, the first phase and frequency recovery circuit recovering a phase and frequency offset between a local oscillator and a horizontal polarization signal in the channel; and a second phase and frequency recovery circuit in a second branch of the channel, the second phase and frequency recovery circuit recovering a phase and frequency offset between a local oscillator and a vertical polarization signal in the channel.

17. An Orthogonal Frequency Division Multiplex transmitter, comprising:

a radio frequency sub-carrier generator to generate a first set of orthogonal sub-carriers and a second set of orthogonal sub-carriers;

a vertical pilot tone generator to provide a vertical polarization pilot tone for each sub-carrier of the first set of orthogonal sub-carriers to produce a vertical polarization signal;

a horizontal pilot tone generator to provide a horizontal polarization pilot tone for each sub-carrier of the second set of orthogonal sub-carriers to produce a horizontal polarization signal;

an offset mixer to mix an offset frequency with the horizontal polarization signal to produce an offset horizontal polarization signal;

a first mixer to impress each one of a first set of data signals on a respective one of the sub-carriers of the vertical polarization signal to produce a first multi-carrier data signal;

a second mixer to impress each one of a second set of data signals on a respective one of the sub-carriers of the offset horizontal polarization signal to produce a second multi-carrier data signal;

a first modulator to modulate the first multi-carrier data signal onto a vertical polarization component of a light wave; and a second modulator to modulate the second multi-carrier data signal onto a horizontal polarization of the light wave.

18. The transmitter of claim 17, wherein the first and second mixers impress the data signals onto the sub-carriers by Quadrature Phase Shift Keying (QPSK).

* * * * *